(12) United States Patent
Maurmaier

(10) Patent No.: US 12,423,851 B2
(45) Date of Patent: Sep. 23, 2025

(54) STORAGE AREA LOADING STATUS MEASUREMENT SYSTEMS AND METHODS

(71) Applicant: Airbus (China) Enterprise Management and Services Company Limited, Beijing (CN)

(72) Inventor: Andreas Maurmaier, Beijing (CN)

(73) Assignee: AIRBUS (CHINA) ENTERPRISE MANAGEMENT AND SERVICES COMPANY LIMITED, Beijing (CN)

( * ) Notice: Subject to any disclaimer, the term of this patent is extended or adjusted under 35 U.S.C. 154(b) by 702 days.

(21) Appl. No.: 17/777,501

(22) PCT Filed: Nov. 18, 2019

(86) PCT No.: PCT/CN2019/119120
§ 371 (c)(1),
(2) Date: May 17, 2022

(87) PCT Pub. No.: WO2021/097599
PCT Pub. Date: May 27, 2021

(65) Prior Publication Data
US 2023/0306627 A1 Sep. 28, 2023

(51) Int. Cl.
*G06K 9/00* (2022.01)
*G06T 7/13* (2017.01)
(Continued)

(52) U.S. Cl.
CPC ............ *G06T 7/62* (2017.01); *G06T 7/13* (2017.01); *G06T 7/70* (2017.01); *G06V 10/25* (2022.01); *G06V 10/764* (2022.01); *G06V 20/70* (2022.01)

(58) Field of Classification Search
CPC ........ G06F 18/22; G06F 18/256; G06F 16/40; G06F 18/24; G06F 18/24765;
(Continued)

(56) References Cited

U.S. PATENT DOCUMENTS

| 2017/0154127 A1* | 6/2017 | Madmony | ........... G06F 16/5854 |
| 2017/0233098 A1* | 8/2017 | Gerard | ................... H04N 7/181 |
| | | | 348/159 |

(Continued)

FOREIGN PATENT DOCUMENTS

| CN | 104864931 | 8/2015 |
| CN | 106143920 | 11/2016 |

(Continued)

OTHER PUBLICATIONS

Written Opinion of the International Searching Authority and International Search Report for PCT/CN2019/119120 dated Aug. 6, 2020 (8 pages).

*Primary Examiner* — Alex Kok S Liew
(74) *Attorney, Agent, or Firm* — Nixon & Vanderhye P.C.

(57) ABSTRACT

A system and a method for measuring the loading status of various storage areas are disclosed including a camera system configured to capture video or images of a storage area, one or more processing modules configured to receive image or video data from the one or more camera of the camera system, determining unoccupied volume of the storage area based on the received image or video data, use the determined unoccupied volume of the storage area to provide output data, and use the output data to provide an optimized storage arrangement for objects, wherein the optimized storage arrangement can be displayed. The system may include a mobile device or other device with a display configured to display the output data and/or indicia based on the optimized storage arrangement.

16 Claims, 17 Drawing Sheets

(51) Int. Cl.
  *G06T 7/62* (2017.01)
  *G06T 7/70* (2017.01)
  *G06V 10/25* (2022.01)
  *G06V 10/764* (2022.01)
  *G06V 20/70* (2022.01)

(58) Field of Classification Search
  CPC ...... G06F 18/253; G06F 16/29; G06F 16/535;
      G06F 16/538; G06F 16/54; G06T
      2207/10032; G06T 17/05; G06T
      2207/30242; G06T 2207/10016; G06T
      2207/20084; G06T 7/70; G06T
      2207/10024; G06T 11/60; G06T
      2207/20021; G06T 7/001; G06T 7/11;
      G06T 2207/20056; G06T 2207/20064;
      G06T 2207/20081; G06T 5/70; G06T
      7/20; G06T 7/254; G06T 19/20
  See application file for complete search history.

(56) References Cited

U.S. PATENT DOCUMENTS

| 2018/0086464 A1 | 3/2018 | Riedel et al. |
| 2018/0111698 A1* | 4/2018 | Podnar ................ G06Q 10/043 |
| 2019/0283880 A1 | 9/2019 | Agarwala |

FOREIGN PATENT DOCUMENTS

| CN | 107021228 | 8/2017 |
| CN | 108202867 | 6/2018 |
| CN | 110015427 | 7/2019 |
| CN | 110341962 | 10/2019 |
| WO | 2019/152120 | 8/2019 |

\* cited by examiner

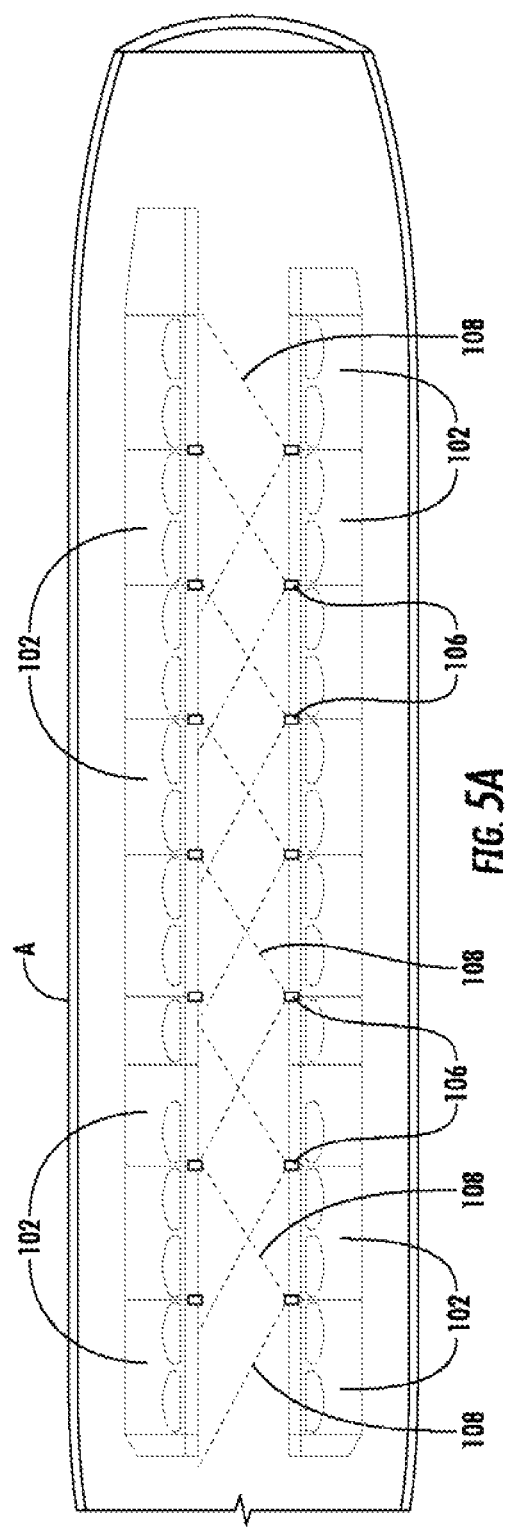

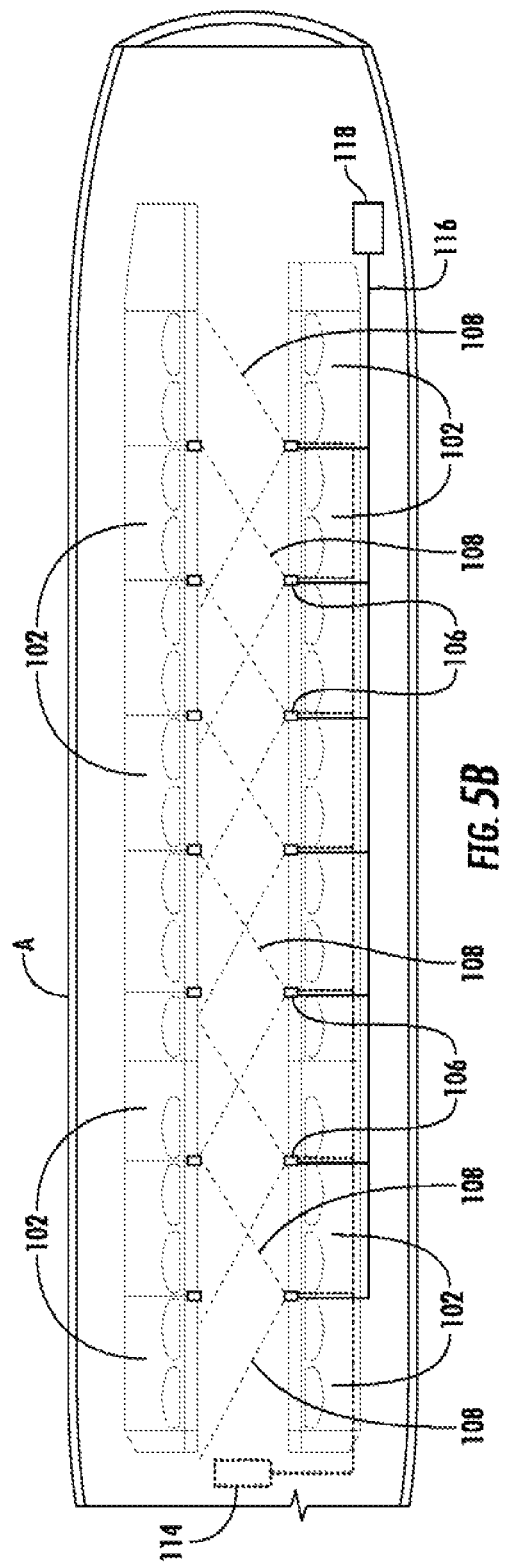

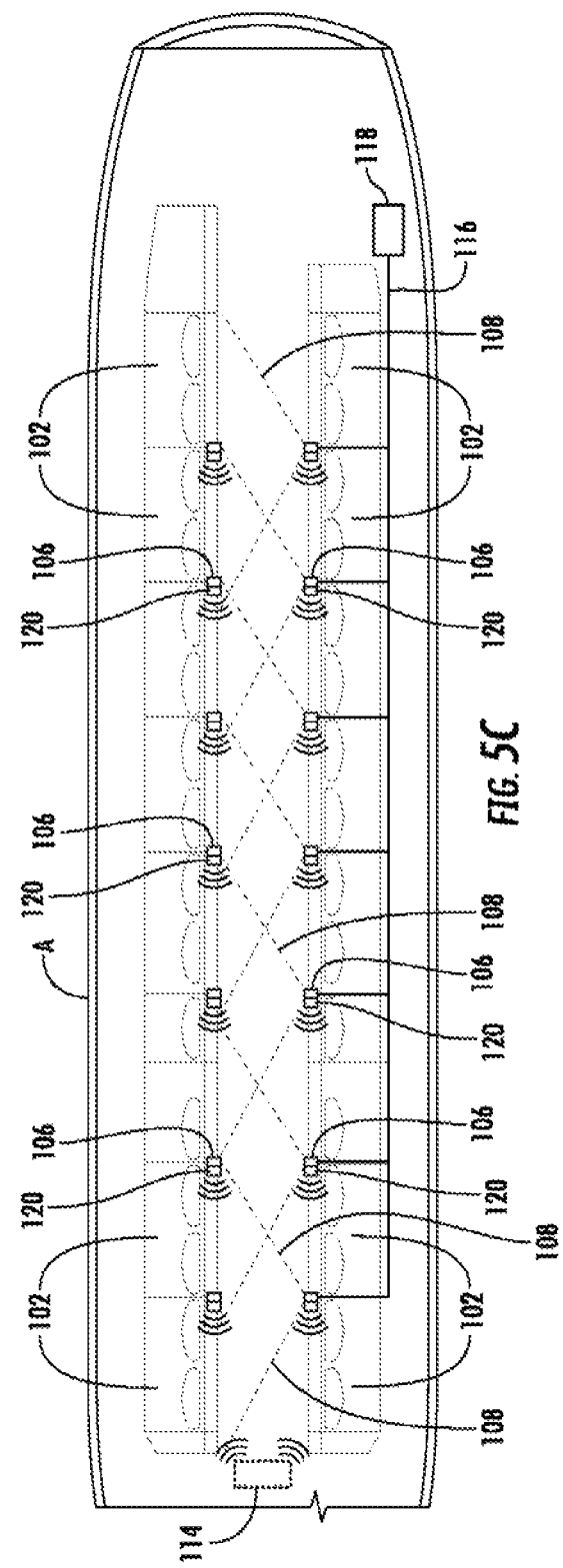

STORAGE AREA LOADING STATUS MEASUREMENT SYSTEMS AND METHODS

CROSS REFERENCE TO RELATED APPLICATION

The present application is a National Phase of International Application Number PCT/CN2019/119120 filed Nov. 18, 2019, which designated the U.S. and the entire contents of which is hereby incorporated by reference.

TECHNICAL FIELD

The subject matter disclosed herein relates generally to storage area systems. More particularly, the subject matter disclosed herein relates to systems and methods for measuring the loading status of storage areas.

BACKGROUND

For airlines, rail transportation companies, and various other passenger and commercial transportation industries, turn-around time, or the time that it takes for passengers or goods to be loaded on a vehicle before it can start again towards its next destination, is important. For example, as an aircraft prepares for departure, the passengers boarding the aircraft usually stow their carryon luggage in onboard storage areas, for example and without limitation, overhead storage (or stowage) compartments (OHSCs). During this onboarding period, many passengers, especially those that are not some of the first to board the aircraft, have difficulty finding storage areas that are not already, at least partially, full. As a result, the passengers have to search around, sometimes quite far from their assigned seat, for an open storage area. This can cause them to move against the flow of the other onboarding passengers and can significantly increase the time in which an aircraft can take to depart.

This problem is not isolated to aircraft. Trains, ferries, buses, and other vehicles have a similar issue. This problem is also not isolated to the transportation of humans. Vehicle transport of commercial goods can also be delayed significantly because items that are being loaded into the transportation vehicles are not efficiently loaded. In such situations, some storage areas in the vehicle are not full and could fit a current good needing to be loaded, but the worker loading the goods would not know that because it is difficult to visually determine the load status of some storage areas. Additionally, this issue can occur in aircraft luggage compartments. Moreover, the issue is not isolated to vehicles either. In addition to transport vehicles, warehouses, grocery stores, and various other commercial enterprises face this same issue when it comes to delivery of commercial goods and the like. The turn-around time in commercial warehouses and the like is the time it takes to completely unload a shipment into the warehouse or grocery store or other facility.

Accordingly, there is a need for a system for measuring the loading status (i.e., occupied and/or free volume) of storage areas so that the storage areas can be more efficiently utilized. Additionally, with the knowledge, or some indication, of the loading status of the various storage areas in whatever setting, passengers, stockers, and transportation employees can more quickly find a storage area in which they can store their luggage, goods, or other item they are currently attempting to store. This will minimize the turn-around time it takes for the airline, commercial enterprise, or other transportation company to depart after loading has begun.

An electronic baggage stowage system was disclosed in U.S. patent application Ser. No. 15/704,209 to Riedel et al. (herein, "Riedel"), the disclosure of which is incorporated herein by reference in its entirety.

SUMMARY

In accordance with this disclosure, systems and methods for measuring, monitoring, and/or determining the loading status of storage areas are provided. In one aspect, a computer-implemented system for monitoring loading status of a physical storage area is provided. In some embodiments, the computer-implemented system comprises: a camera system comprising one or more camera wherein each camera is configured to capture video or images, or both video and images, of the storage area; and one or more processing module in communication with the camera system, the one or more processing module comprising one or more processor and the processing module configured to: receive image or video data from the one or more camera of the camera system; determine unoccupied volume of the storage area based on the received image or video data; and use the determined unoccupied volume of the storage area to provide output data that can be displayed to indicate loading status of the storage area.

In some embodiments, the processing module is configured to determine the unoccupied volume by: identifying, labeling, and categorizing objects stored in the storage area; calculating a volume of each object in the storage area; and calculating the unoccupied volume in the storage area. In some further embodiments, calculating the volume of each object comprises: identifying edges of the objects stored; measuring a distance of the edges; calculating the volume of the object based on the edge distance; and wherein calculating the unoccupied volume comprises subtracting the volume of each of the objects in the storage area from a total volume of the storage area.

In another aspect, a computer-implemented system for a passenger transport vehicle for monitoring storage of baggage in storage areas is provided. In some embodiments, the storage system comprises: a plurality of physical storage areas in a passenger cabin of the transport vehicle, wherein the storage areas comprise and define separate storage spaces; a camera system comprising a plurality of cameras positioned in the passenger cabin and configured to capture video or images, or both video and images, of the storage spaces; each of the plurality of cameras being positioned and configured to capture video or images, or both video and images, of a storage space and at least a portion of an adjacent storage area such that at least some of the cameras have overlapping fields of view; and a processing module in communication with the camera system, the processing module comprising a processor and configured to: receive image or video data from the one or more camera of the camera system; determine unoccupied volume of the storage area based on the received image or video data; use the determined unoccupied volume of the storage area to provide output data; and use the output data to provide an optimized storage arrangement for objects, wherein the optimized storage arrangement can be displayed.

In yet another aspect, a computer-implemented method for monitoring loading status of objects in storage areas is provided. In some embodiments, the computer-implemented method comprises: using a camera system comprising one or more camera wherein each camera is configured to capture video or images, or both video and images, of at least one or more physical storage area for storing objects; using a processing module that comprises a processor and that is in communication with the camera system to: receive image or video data from the one or more camera of the camera system; determine unoccupied volume of the storage area based on the received image or video data; and use the determined unoccupied volume of the storage area to provide output data that can be displayed to indicate loading status of the storage area.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 5A, FIG. 5B, and FIG. 5C illustrate various top views of an aircraft fuselage comprising an example system of the present disclosure;

DETAILED DESCRIPTION

Figure 1:
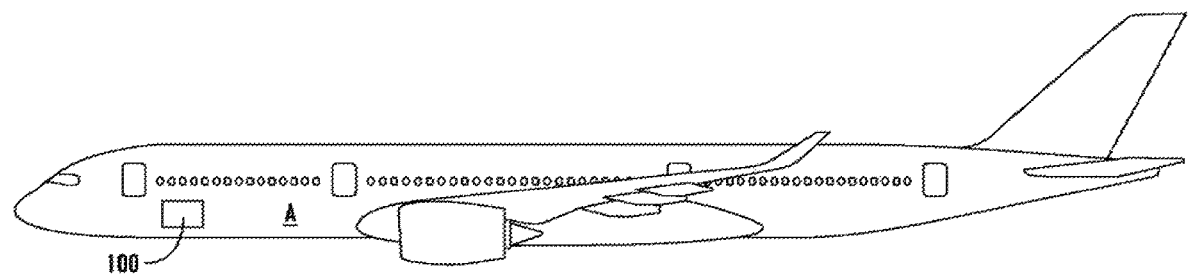
FIG. 1 is an illustration of an example vehicle comprising a system according to an embodiment of the presently disclosed subject matter.

The present subject matter provides systems and methods for measuring the loading status of various physical storage areas, including for example and without limitation, transportation vehicle storage areas as well as commercial warehouse storage areas and various other storage area locations. Those having ordinary skill in the art will appreciate that various vehicles, especially passenger and commercial goods transportation vehicles, require efficient loading of passengers and goods in order to achieve certain timing goals. In other words, in order for transportation vehicles to depart and arrive at their destination at the correct times, they need to be efficiently loaded with their passengers and cargo. A similar issue is faced by many commercial enterprises that have goods storage areas in warehouses and other locations, where goods need to delivered as efficiently as possible.

A major technical issue that the present disclosure attempts to solve is determining the utilized and/or open space of certain storage areas. The present disclosure attempts to solve this issue by providing systems, devices, and methods for measuring the loading status (i.e., the occupied or used and/or unused or free volume of the storage area) and then informing (for example, by displaying indicators on a mobile device, vehicle terminal, or on or around the storage area itself) a user, delivery personnel, or passenger of possible storage areas that are open or partially open for storage of a particular good, piece of luggage, garment, or other object that requires stowage in the storage area. By informing the user, passenger, worker, or other suitable actor (such as a robot) of the storage areas that are at least partially available, it allows the actor to store their object in an efficient manner and minimizes the time it takes for the departure of the vehicle to occur or minimizes the time it takes to fill the storage area of a commercial warehouse or the like.

Although some of the disclosure herein describes the systems, devices, and methods of the present disclosure with respect to an aircraft, those of ordinary skill in the art will appreciate that the systems and methods in accordance with the disclosure herein are relevant in many different use cases. For example and without limitation, the subject matter described herein can be utilized in trains, buses, other rail cars, trams, ferries, cruise ships, boats, commercial warehouses, grocery stores and any other location that comprises storage areas that are configured to be filled with passengers, passenger luggage/objects, commercial goods, and the like.

Additionally, it should be noted that devices and systems of the present disclosure are not to be construed as to only be located in the positions they are shown in the figures. Various components can be located within and around the vehicle as well as outside the vehicle depending on the various requirements of each of the devices and systems.

Furthermore, the subject matter described herein can be combined with various sensors and detectors known to those having ordinary skill in the art that are capable of measuring the weight or measuring the empty space of the storage areas at defined positions to increase the accuracy of the measurements calculated by the devices described below. However, the subject matter disclosed herein is an improvement on other devices that use only sensors because those devices require a significant number of sensors to be installed in the storage area in order to achieve an acceptable measurement result. In the present disclosure, only a single camera can be used and additional sensors can be included merely to increase the accuracy of the measurements as described above.

FIG. 1 illustrates an example vehicle, for example and without limitation, aircraft A on which storage area loading status measuring system 100 can be installed. In some embodiments, as described above, the storage area loading status measuring system 100 can be incorporated into any of a variety of transport vehicles or commercial buildings/ locations. Additionally, it should be noted that, although various embodiments of the storage area loading status measuring system 100 are described herein as being located in certain positions inside the aircraft A or vehicle, those having ordinary skill in the art will appreciate that the cameras, processors, power sources, visual displays, and other devices of the present disclosure can be positioned in almost any location in and around the aircraft A. Moreover, the storage area loading status measuring system 100 of the present disclosure can be a computer-implemented storage system for monitoring baggage storage, such as luggage and/or cargo.

Figure 2:
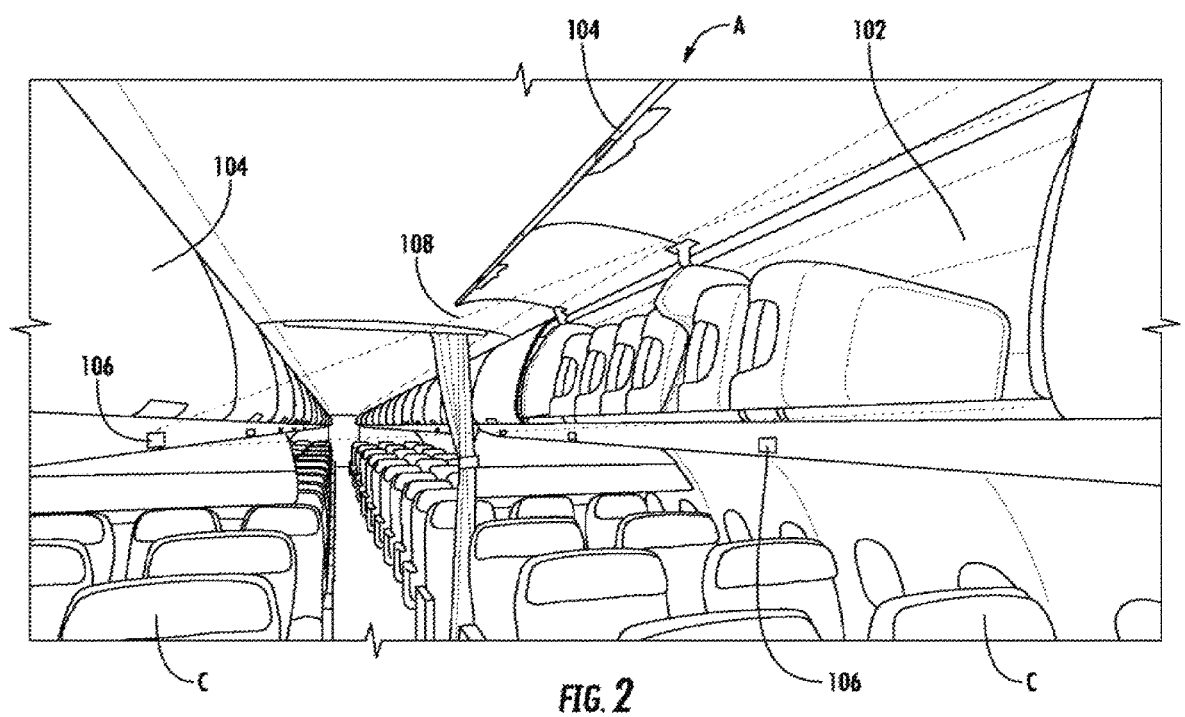
FIG. 2 is an illustration of an inside of an aircraft fuselage from the perspective of the front of the aircraft detailing the aisle, overhead storage compartments (OHSCs) and components of the system of the present disclosure.

FIG. 2 is an illustration of an interior of an example vehicle, for example and without limitation, aircraft A from FIG. 1. The view illustrated in FIG. 2 is from the perspective of a viewer positioned inside the fuselage at the front of the passenger aisle looking to the back of the aircraft A. In this illustration, one can observe the aisle of the aircraft with rows of chairs C on either side of the aisle. Additionally, like most commercial aircraft, above the chairs C, on either side of the aisle, there is a plurality of physical storage areas, such as, for example, in this case, overhead storage compartments (OHSCs) 102, where passengers can store their carryon luggage and other objects (books, bags, jackets, fishing rods, sporting equipment, etc.). As described further herein, some or each of the OHSCs 102 comprises an optical sensor such as camera 106 attached to the bottom or underneath the OHSC 102. Also, some types of OHSCs 102 have doors 104. Furthermore, in some embodiments of the present subject matter, the cameras 106 can have a recording direction or angle of view 108 facing the OHSC 102 on the opposite side of the aisle from it. In other words, a camera 106 attached to the bottom of an OHSC 102 on the right can face the OHSC 102 on the opposite side of the aisle (i.e. the left) and the camera 106 can be located a distance away from the OHSC 102 it is recording such that when the camera 106 on the left is recording, it is recording the OHSC 102 on the right. In some embodiments, the camera(s) 106 described herein are configured to capture, record, and/or forward video, images, or both video and images of the OHSC(s) 102 or other storage area they are intended to capture.

However, as described further herein, in some embodiments, the cameras 106 can also be placed inside and at the front of the OHSC 102 or other storage area, their angle of view facing to the back of the OHSC 102. In this scenario, instead of cameras 106 on opposite sides of the aisle recording respective OHSCs 102, the cameras 106 within respective OHSCs 102 are recording the inside of the storage areas they are mounted.

Figure 3A:
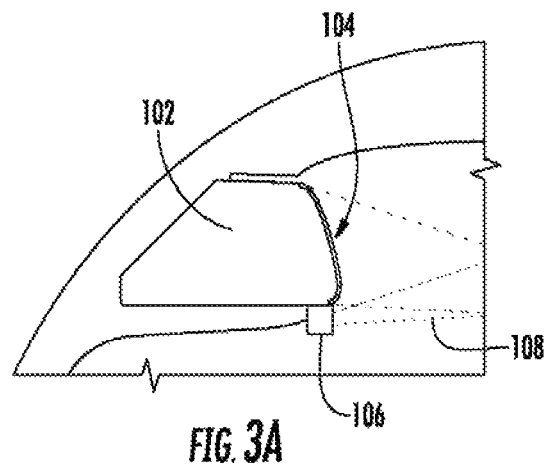
FIG. 3A, FIG. 3B, FIG. 3C, and FIG. 3D illustrate several views of an OHSC with a camera attached at an example location according to some embodiments of the present disclosure.
Figure 3B:
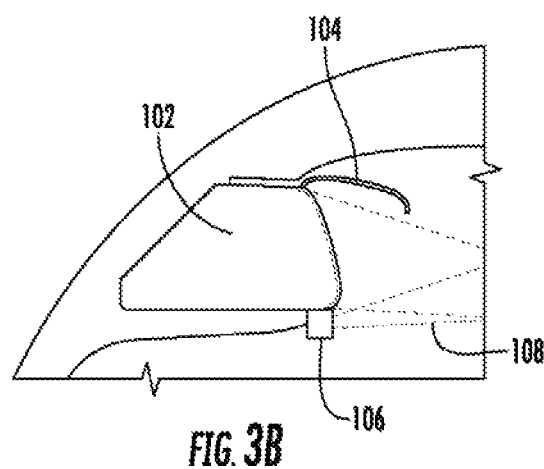

FIG. 3A is a side view of an example OHSC 102 that is stationary and comprises a door 104 that is configured to close the storage area. In this view, the door 104 is closed. In some embodiments, the storage area loading status measuring system 100 can comprise one or more camera 106 attached on, below, inside of, or above, an OHSC 102. In this particular visualization, the camera 106 is attached at the bottom of the OHSC 102 with a field of view or viewing angle 108 facing away from the OHSC 102 it is attached to. As will be shown more clearly herein below, the camera's 106 field of view or viewing angle 108 is actually facing the OHSC 102 on the opposite side of the aisle that the camera 106 is attached to. In some embodiments, the camera 106 is attached in a position such that the door 104 does not obstruct the view of the recording camera 106. As shown in FIG. 3B, as the door 104 of the OHSC 102 opens, it would obscure the view if the camera 106 were located at the top of the OHSC 102 where the door 104 hinges. Thus, in this configuration, with an OHSC 102 that has a door, the most practical placement for the camera 106 is at the bottom of the OHSC 102.

Figure 3C:
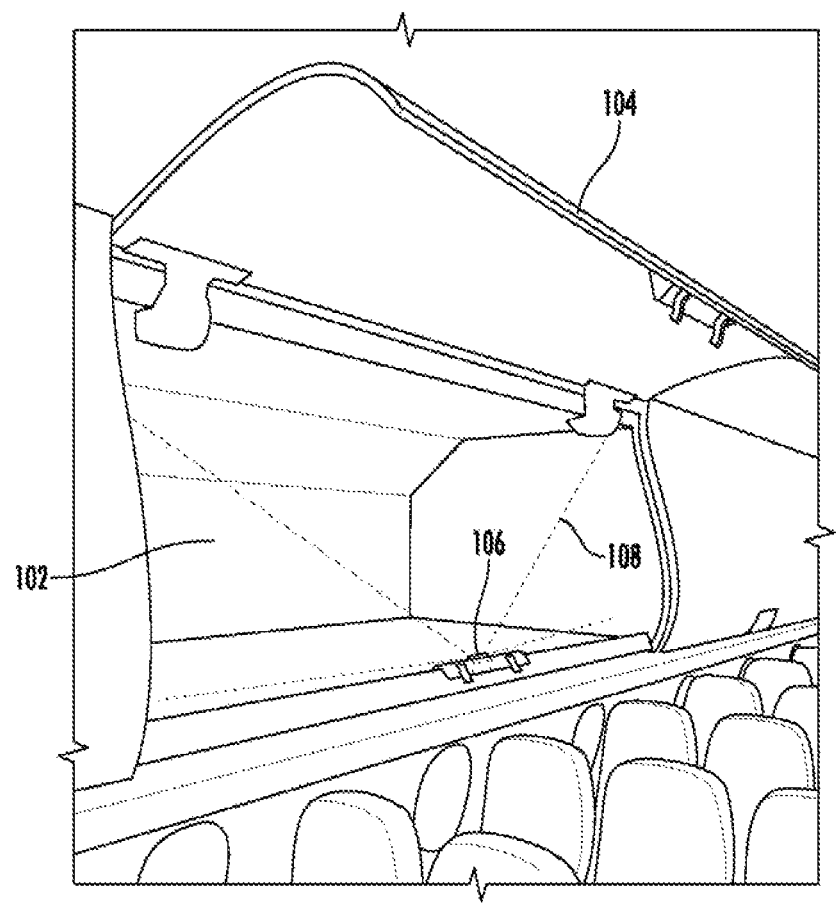

FIG. 3C illustrates an example OHSC 102 from the perspective of an observer looking into the OHSC 102 with the door 104 open. This view illustrates that in some embodiments, one or more camera such as camera 106 can be located inside the OHSC 102 and not just on the outside. In this configuration, one or more camera 106 can be installed inside the OHSC 102 with the angle of view (i.e., the lens and recording feature of the camera) facing the back of the OHSC 102 and not facing outside. In some embodiments, the camera 106 can be mounted on the bottom surface of the OHSC 102 or it can be placed on the top surface (i.e. ceiling) of the OHSC 102. In some embodiments, the lens of the camera 106 being used can be for example, a wide angle lens such that it can better capture the luggage and other objects being stored in the OHSC 102. For example and without limitation, the lens can be a wide-angle lens with an angle of view of between about 60° and 310°. In some embodiments, the lens can have an angle of view of between about 95° and 220°. In some embodiments, the lens can have an angle of view of between 180° and 220°. In some embodiments, the lens can have an angle of view of between 114° and 180°.

In some embodiments, one or more camera 106 can be installed inside the OHSC 102 as described hereinabove. In some embodiments, especially where only one camera 106 is used, the camera 106 can be installed in the middle of the front of the bottom inside shelf of the OHSC 102 (i.e., the floor of the OHSC 102 or the surface where the luggage or other objects lays upon). In some embodiments, where multiple cameras 106 are used, the cameras 106 can be installed symmetrically, or not, at the front of the inside shelf of the OHSC 102 and positioned such that, in combination, the multiple cameras 106 can view all of the luggage and objects stored in the OHSC 102. Additionally, the maximum number of cameras 106 that can be installed is equal to the width of the front bottom portion of the shelf of the OHSC 102 divided by the width of the cameras. However, the key is that there enough cameras and that they are spaced out in such a manner that allows the cameras 106 to view and/or record, in combination, the entirety of the inside of the OHSC 102 other than the space taken up by the cameras 106 themselves and some portion of the periphery of each of the cameras 106.

Figure 3D:
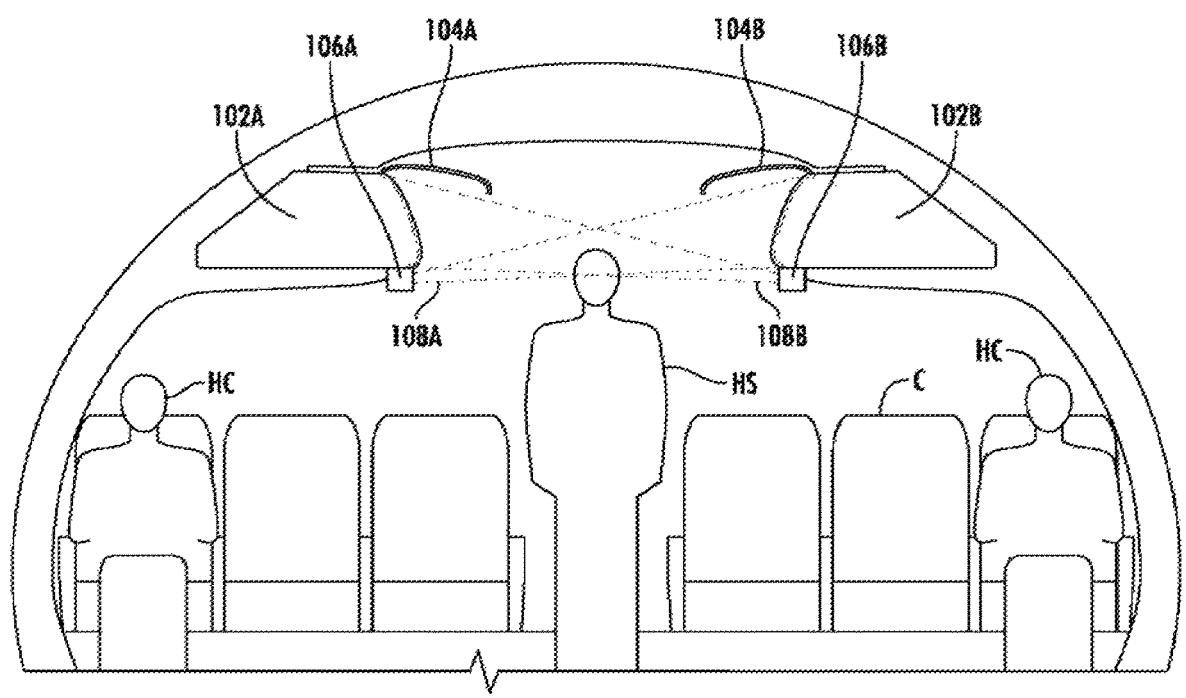

FIG. 3D illustrates a cross section of the fuselage of an example aircraft A comprising an example storage area loading status measuring system 100 according to some embodiments of the present disclosure. On one side of the figure, a first OHSC 102A is positioned above three chairs C, like a typical passenger aircraft A. On the other side of the aisle, opposite the first, a second OHSC 1028 is positioned above another three chairs C. In this embodiment, the first OHSC 102A comprises a first camera 106A attached to the bottom of the outside of the first OHSC 102A. As shown, the first camera 106A has a first angle of view 108A (i.e. the lens and recording portion of the first camera 106A) that is pointed at the opened second OHSC 1028. This figure illustrates that the first camera 106A is configured such that it can view the entirety of the second OHSC 1028 as indicated by the first angle of view 108A lines. Likewise, the second OHSC 1028 comprises a second camera 1068 attached to the bottom of the outside of the second OHSC 1028. As shown, the second camera 106B has a second angle of view 108B (i.e. the lens and recording portion of the second camera 106A) that is pointed at the opened first OHSC 102A. This figure illustrates that the first camera 106A is configured such that it can view the entirety of the second OHSC 102B as indicated by the first angle of view 108A lines.

It should be noted that the depiction in FIG. 3D is only of one of a plurality of rows of chairs C with respective OHSCs 102 and cameras 106 above the chairs. As will be shown herein below, the aircraft A fuselage can have one or a plurality of these features, one for one or more row of seats and OHSC 102. Additionally, FIG. 3D depicts several seated passengers HC in chairs that have already walked down the aisle and found their seat and standing passengers HS walking down the aisle, trying to find their seat as well as a place to put their luggage, objects, and/or effects.

Those of ordinary skill in the art will appreciate that, as described above, the first door 104A and second door 104B does not obstruct the first angle of view 108A of the first camera 106A or the second angle of view 108B of the second camera 106B. However, as standing passengers HS walk down the aisle to store their luggage in the OHSCs 102, parts of their bodies (i.e., their heads, shoulders, arms, hands, hair, luggage, effects, etc.) may obstruct the view of the first camera 106A and/or the second camera 106B, or any other camera along the aisle. If this is the case, then normally, the system of the present disclosure might not work properly because in order to calculate the loading status of the different OHSCs 102 the cameras 106 need to be able to view the OHSC 102 across the aisle from the camera 106. To combat this, in some embodiments, as described above, the first camera 106A and the second camera 106B can comprise wide-angle lenses such that they can view and/or capture more than just the second OHSC 102B and first OHSC 102A, respectively. Additionally, in some embodiments, the first camera 106A and second camera 106B are spaced close enough to one or more other cameras 106 such that the field of view 108 of the cameras 106 combined can collectively capture and/or view each and every OHSC 102 in the fuselage of the aircraft A. FIG. 5A depicts this more clearly and will be described further hereinbelow.

Figure 4A:
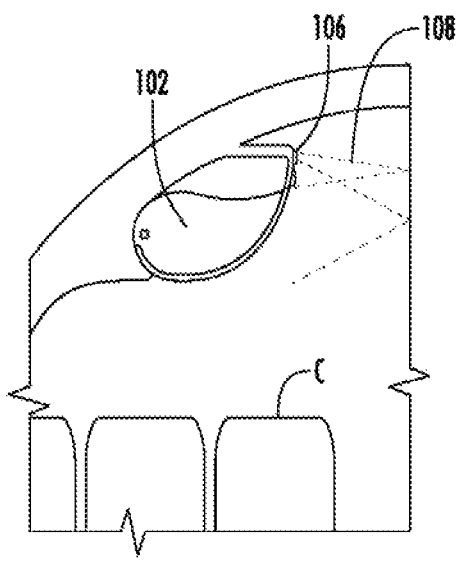
FIG. 4A, FIG. 4B, FIG. 4C, FIG. 4D, and FIG. 4E illustrate several views of an alternative OHSC design with a camera attached at a different example location according to some embodiments of the present disclosure as well as additional sensors according to some further embodiments of the pending disclosure.
Figure 4B:
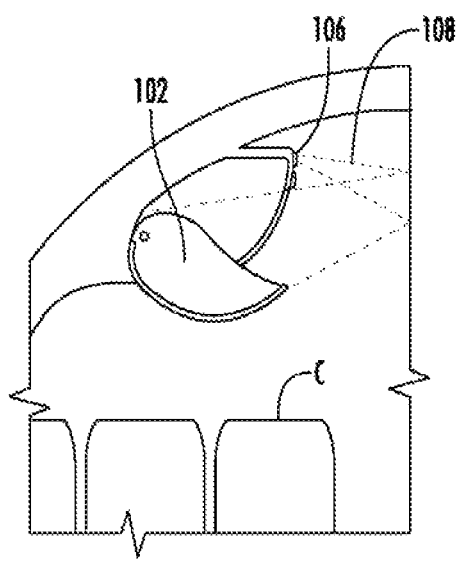

FIG. 4A illustrates a similar view to FIG. 3A. However, in this embodiment, the OHSC 102 is a movable storage area. Here, instead of the OHSC 102 having a door 104 to close the OHSC 102, the OHSC 102 is configured to pivot, rotate, or otherwise move to expose the contents within. In the previous figures, the OHSCs 102 had a moving door 104 that was hingedly attached and opened and closed to reveal or obscure the contents within and the bottom of the OHSC 102 did not move. However, as shown in FIG. 4B, the bottom of the OHSC 102 does move as it pivots or rotates from a raised or closed position to a lowered or opened position. In such an embodiment, if the camera 106 were located at the bottom of the OHSC 102 like ones shown in FIG. 3A, the opened OHSC 102 in FIG. 4B would obscure the camera 106 or it would be looking at the floor of the fuselage. Thus, in embodiments where the OHSC 102 pivots or rotates from a raised or closed position to a lowered or opened position, the camera 106 needs to be located at a different position than before.

As illustrated in FIG. 4B, in some embodiments, the camera 106 can be mounted, attached, or affixed above where the OHSC 102 opens. In some embodiments, one or more camera 106 can be affixed or attached above the handle or latch that opens the OHSC 102. In some embodiments, one or more camera 106 can be affixed or attached beside or on either side of the handle or latch that opens the OHSC 102. In some embodiments, just as before, the one or more camera 106 is configured to capture or view images or video or both images and video of the OHSC 102 on the opposite side of the aisle.

Figure 4C:
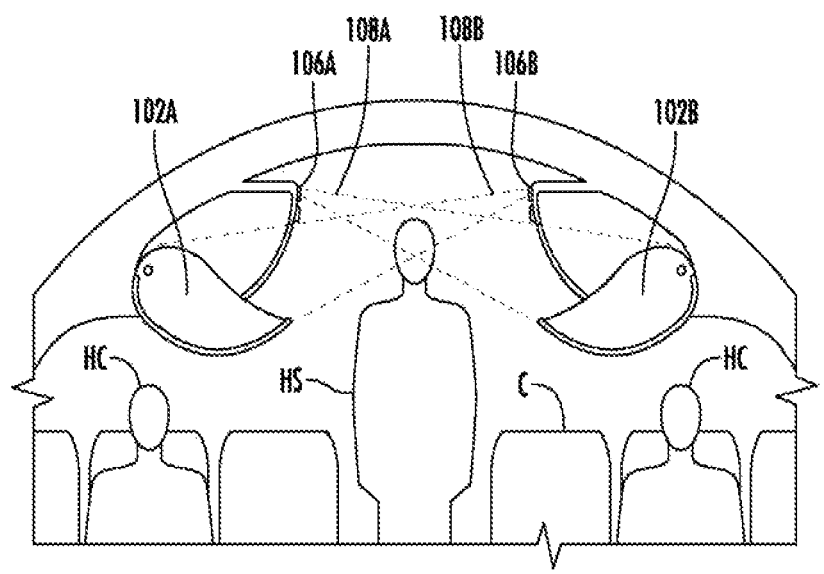

FIG. 4C illustrates a similar layout as FIG. 3D, however, in this case, the first camera 106A and the second camera 106B are located above the first OHSC 102A and the second OHSC 102B, respectively. In this particular scenario, just like before, the first angle of view 108A looks down and over from the first camera 106A to the opened second OHSC 102B and the second angle of view 108B looks down and over from the second camera 106B to the opened first OHSC 102A. Just as before, the walking passenger HS can obscure (i.e., via their head, shoulders, arms, hands, luggage, effects, etc.) the first angle of view 108A and/or the second angle of view 108B.

Figure 4D:
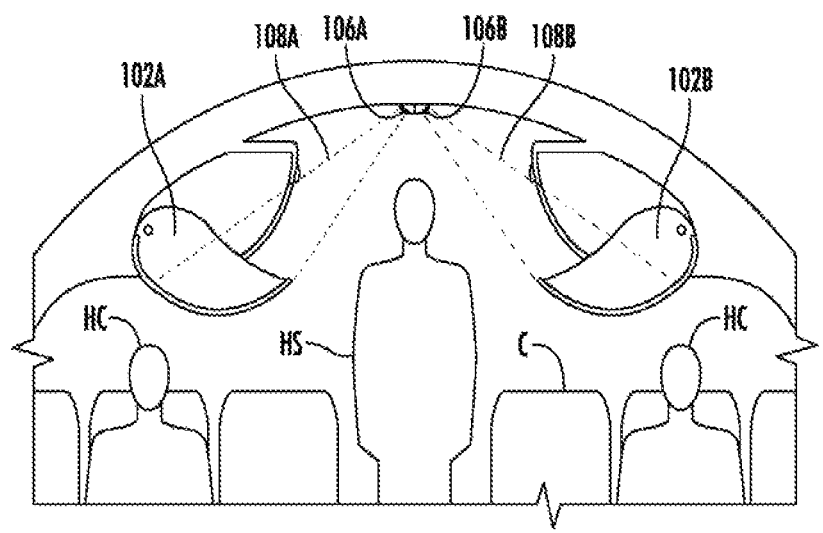

In an embodiment with movable OHSCs 102, in order to avoid issues where a standing passenger HS obscures a portion of the first angle of view 108A and/or the second angle of view 108B, in some embodiments, the first camera 106A and/or the second camera 106B can be mounted or attached to a different position. For example and without limitation, as illustrated in FIG. 4D, the first camera 106A and/or the second camera 106B can be mounted or attached to the ceiling of the aircraft A fuselage. In such an embodiment, and as shown in the figure, the first angle of view 108A and the second angle of view 108B are configured to face the first OHSC 102A and the second OHSC 102B, respectively. As shown in this illustration, the likelihood of standing passengers blocking or obscuring the first angle of view 108A and/or the second angle of view 108B is significantly reduced. Although there are other embodiments and configurations of the first OHSC 102A and the second OHSC 102B in which the first camera 106A and/or the second camera 106B can be positioned on the ceiling in this manner, one embodiment that would be difficult to perform this particular arrangement of the first camera 106A and/or the second camera 106B would be the embodiments where the first OHSC 102A and the second OHSC 102B comprise doors and lift up and obscure the cameras (i.e. the design shown in FIG. 3B). In the embodiment disclosed in FIG. 4D, one scenario in which the first angle of view 108A and/or the second angle of view 108B would be obscured is when a standing passenger HS is placing her bag in the respective OHSC 102.

Figure 4E:
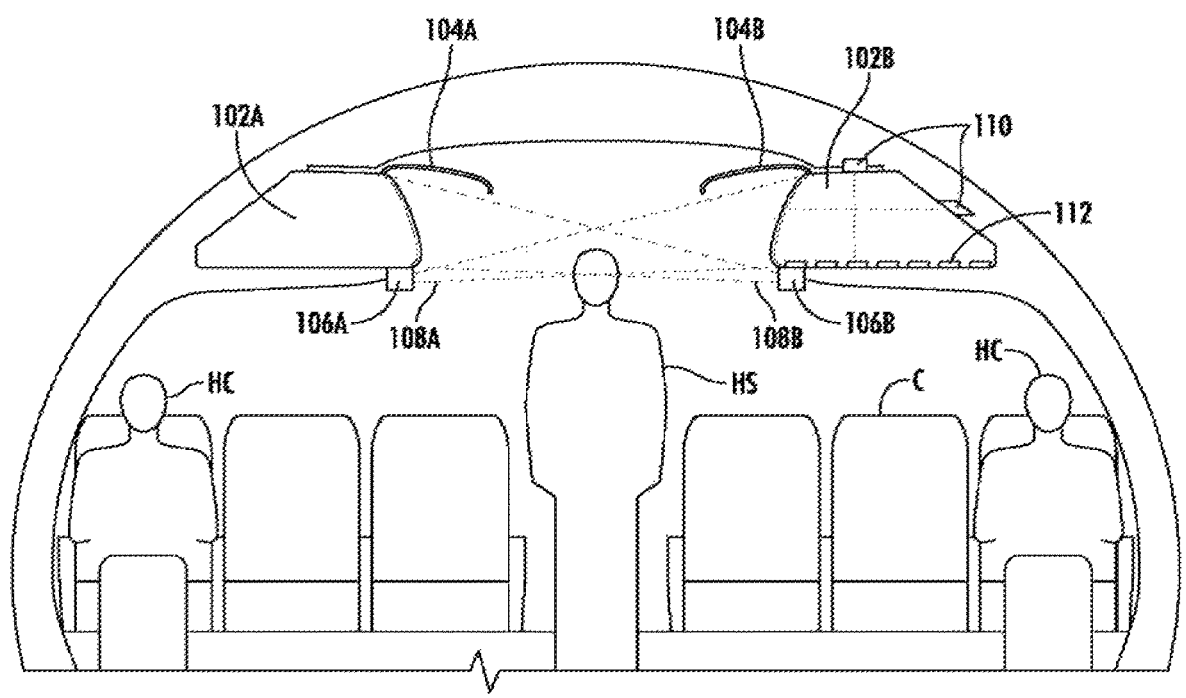

Additionally, as illustrated in FIG. 4E, in addition to the cameras 106 described herein, one or more of the OHSCs 102 can comprise one or more additional sensors to assist the storage area loading status measuring system 100 of the present disclosure in obtaining a more accurate measurement of the loading status of the OHSC 102. For example and without limitation, distance measurement sensors 110 and weight measurement sensors 112 can be combined with the cameras 106 to help determine a more accurate measurement of the loading status of the OHSCs 102. Distance measurement sensors 110 can, for example, be used to determine how far from the back wall of the OHSC 102 a particular piece of luggage is to help better determine the volume of the piece of luggage, versus assuming it takes up the entire volume of its two-dimensional boundaries as described herein with respect to FIG. 6. Additionally, weight measurement sensors 112 can be included in some embodiments, to help determine if a piece of luggage or other object is actually in the OHSC 102 by detecting if there is weight on the shelf or bottom surface of the OHSC 102. By including either or both of the distance measuring sensors 110 and the weight measuring sensors 112, the calculated or determined unoccupied volume can be adjusted to correct for inefficiently loaded OHSCs 102. In some embodiments, the cameras 106 of the present disclosure can also be used to detect smoke or other visible gas in the storage area(s) and elsewhere throughout the aircraft or other transport vehicle or commercial building. It is envisioned that other types or sensors or sensing devices can be used in addition to the cameras 106, and that data from the additional sensors or sensing devices can be used in association with data from the cameras 106 for coordinated data analysis. For example and without limitation, temperature sensors and/or sensors configured to detect chemicals can be included in or near the storage areas. These features can be particularly advantageous in a cargo area, such as the cargo area of an aircraft, for example to detect a thermal runaway of one or more batteries or other situations.

FIG. 5A illustrates a top view of an example vehicle, such as an aircraft A, and more specifically, a top view of the inside of the fuselage of the aircraft A. In some embodiments, the aircraft A can comprise one or a plurality of physical storage areas, such as OHSCs 102. In some embodiments, each OHSC 102 can be comprised of two sections, each section able to be reached by opening a door (i.e., two doors per OHSC). In some embodiments, the aircraft A can further comprise one or more optical sensors such as a camera system comprising one or more camera 106, wherein each camera 106 is configured to monitor and capture video or images, or both video and images of the physical storage areas or OHSCs 102. In this illustration, both sides of the aisle of the fuselage have cameras attached to the OHSCs 102, however, only one side has angle of view lines 108. This is not meant to be limiting in any way, but merely to reduce clutter on the image. For example and without limitation, in some embodiments, the cameras 106 on the other side of the aisle that do not have angle of view lines 108 drawn will have the same angles of view 108 of the ones labeled, but they will be facing in the opposite direction as the ones currently labeled. Furthermore, in some embodiments, each camera 106 has a sufficiently large angle of view 108 such that each camera 106 can see at least two OHSCs 102. However, the present disclosure should not be construed as to be limiting in any way in terms of the positioning of the cameras 106 or their respective angles of view 108. For example, instead of each camera 106 being positioned between two OHSCs 102, each camera 106 can be positioned in the middle of a single OHSC 102, or any other suitable location, including on the ceiling, as shown in FIG. 4D.

Those having ordinary skill in the art will appreciate that the layout of the cameras 106 depicted in FIG. 5A allows for each angle of view 108 to overlap with other angles of view 108. As described above, this allows storage area loading status measuring system 100 to observe and measure various OHSCs 102 even though the camera 106 pointed at the particular OHSC 102 may be partially or even fully obscured by a passenger and/or their effects.

In addition to the description above, those having ordinary skill in the art will appreciate that the system disclosed herein can be implemented in aircraft (or other transport vehicles or commercial buildings) with more than one aisle or no aisles at all. For example, as described herein, the systems and methods of the present disclosure can be adapted to operate in aircraft with two or more aisles or in the cargo area of an aircraft (i.e. no aisles). In such examples where two or more aisles are present in the aircraft, cameras can be installed at or on the OHSCs of one or more aisles as described herein.

As illustrated in FIG. 5B, in some embodiments, each of the cameras 106 can be in communication with one or more processing module such as, for example and without limitation, central processor 114. In some embodiments, the processing module, or central processor 114, comprises one or more processors, non-transitory computer readable media such as random-access memory (RAM) and/or a hard drive, such as a solid-state drive or hard-disk drive, and a wired or wireless connection or one or more of the cameras 106. In some embodiments, the RAM and/or hard drive comprises a computer algorithm configured to perform the analysis and calculations necessary to determine the loading status (i.e., the used storage volume and/or free storage volume) of some or all of the storage areas on the aircraft A, including, at least the loading status of one or more of the OHSCs 102. In some embodiments, the central processor 114 is a server or other computer.

In some embodiments, as described above, one or more of the cameras 106 is configured to capture image data or video data or image data and video data of its respective OHSC 102. In some embodiments, as these data are collected, the cameras 106 are configured to transmit the data to the central processor 114. From there, the central processor 114 is configured to process the images using image processing or computer vision software as described below.

In some embodiments, when image or video data is captured that includes an image or video of an OHSC 102 that is obscured by a person, any portion of their body, their effects, or any other object, the central processor 114 is configured to optimize the images (i.e., splice multiple images and/or video together from surrounding cameras 106 that also captured the same OHSC 102 as the obscured camera 106 at the same time) such that a complete and unobscured image or video can be generated.

In some embodiments, each of the cameras 106 is powered by power source 116 or some other appropriate source such as a battery. In some embodiments, the cameras 106 can comprise power-over-ethernet (POE) cameras and be all be connected to a POE switch. The POE switch will act as the power source 116, giving the cameras 106 sufficient voltage to power on. In some other embodiments, the power source 116, including if it was a POE switch, can be connected to the central processor 114 as well, giving the cameras 106 a wired connection to the central processor 114.

As illustrated in FIG. 5C, each, some, or all of the cameras 106 can comprise so-called "smart cameras" that are combined with one or more processors 120 integrated with the camera 106. In other words, each, some, or all of the cameras 106 can have their own processor 120. In such embodiments, instead of the processing, described herein, occurring at the central processor 114, the processing of the images and calculations occur in a distributed fashion (i.e., each of the camera/processor combinations perform the analysis and calculations described herein and either transmit the result to the central processor 114 for data consolidation or transmit the results to a display device as described with respect to FIG. 7A and/or FIG. 7B) instead of being performed centralized like the embodiment depicted in FIG. 5B. In some embodiments, as described above, one or more of the cameras 106 has a wireless connection to the central processor 114 via the processor 120 incorporated into the camera 106. This wireless connection can be used to transmit image or video data as well as processing/calculation results as to the loading status of respective OHSCs 102 that the particular camera 106 and processor 120 combination is configured to monitor.

In some embodiments, if a camera 106 and processor 120 capture an obscured image or video of its respective OHSC 102, and it is attempting to process the image or video, it is configured to either transmit a request to its camera 106 neighbors and/or the central processor 114 for images or video captured at the same time to receive unobscured video or images of the same scene so that the images or video can be optimized (i.e., spliced together). Alternatively, in some embodiments, in the layout of FIG. 5C, if a camera 106 captures an obscured image or video, it can transmit the image or video to the central processor 114 with a request that the central processor 114 perform the splicing. In such an embodiment, the central processor 114 would either receive automatically the images or video from surrounding cameras 106 or it would request and receive the images or video and splice the images and video together to create a complete, unobscured image or video. From there, the central processor 114 could perform the processing and analysis described below, or it could send the spliced images or video back to the camera 106 that captured the obstructed view.

Up to this point, the major components of the storage area loading status measuring system 100 have been described in terms of how they are laid out in an aircraft. However, as described above, the cameras 106, central processors 114, and various other devices can be laid out in any suitable and logical manner that gives the cameras 106 (whether alone or in combination) a viewing angle 108 to monitor and record images and/or video of the storage area being filled with luggage, effects, commercial goods or other objects.

After the cameras 106 have captured or recorded the images and/or video of their respective OHSC(s) 102, and the images have been optimized and spliced together to ensure that an unobstructed view of the storage area and its contents is present in the image, one or more processors (i.e., the central processor 114, processor 120, or some other processor, such as the main aircraft/vehicle computer) is configured to determine, from the optimized image(s) and/or video, the free and/or occupied volume of the respective OHSC 102. In other words, the one or more processors is configured to receive the image or video data or both image and video data from the cameras 106, analyze the data, and determine or identify from the received data, the free and/or occupied volume of the respective OHSC 102. The one or more processors is configured to perform these calculations by using a computer vision algorithm embedded in the non-transitory computer readable medium of the one or more processors.

In some embodiments, the central processor 114 and or the processors 120 can be configured to maintain a history or memory of the images that were taken before so that, just in case of a malfunction or in case a storage area is obscured or prematurely closed, the latest available loading status that was valid before the malfunction or other event can still be displayed.

Figure 6:
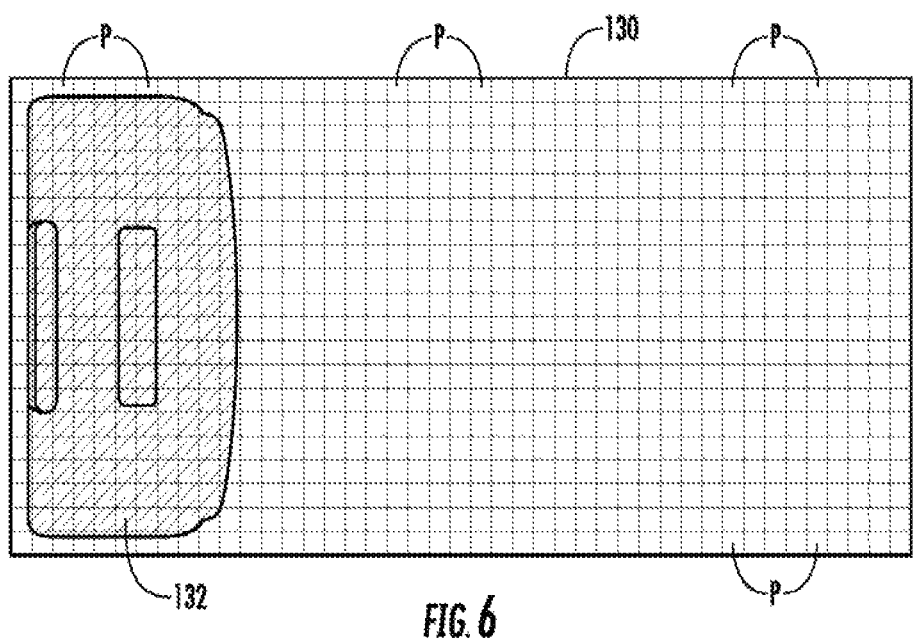
FIG. 6 illustrates an example of how an algorithm of the present disclosure determines the volume of a passenger object.

FIG. 6 illustrates a two-dimensional visualization of an example computer vision algorithm and how the algorithm can calculate the free and/or occupied volume. Initially, the computer vision algorithm must be given the dimensions of the relevant storage area or OHSC 102. FIG. 6 includes an optimized digital image of example storage area 130. For example and without limitation, the computer algorithm uses the dimensions of example storage area 130, which can be in units of pixels or other units as long as the algorithm knows how many units each pixel P is. As a hypothetical, assume that each pixel P in FIG. 6 represents a one-inch by one-inch square (i.e., 1"×1"). In some embodiments, for example, the computer vision algorithm can also be given depth dimensions of the example storage area 130 such that, the computer vision algorithm knows the available volume of the example storage area 130 if not luggage was stored at all.

In some embodiments, the computer vision algorithm can assume that an object fills the entire volume behind itself in the example storage area 130. For example, the luggage 132 in the example storage area 130 is two-dimensional in FIG. 6, however, in reality, the luggage 132 is three-dimensional. The image shown in FIG. 6 is merely the front face of the luggage 132. However, those having ordinary skill in the art will appreciate that the luggage 132 extends into the back of the example storage area 130 such that it takes up some or all of the volume behind the two-dimensional face of the luggage 132. As described above, in some embodiments, the computer vision algorithm can assume that a luggage item 132 occupies the volume of the example storage area 130 from the face of the luggage 132 displayed on FIG. 6 all the way back to the back wall of the storage area 130. By assuming that the luggage 132 takes up the entire volume from its two-dimensional boundary back to the back wall of the storage area 130, the computer vision algorithm can simplify calculations such that extra sensors and/or cameras are not needed to acquire depth information.

Because the computer vision algorithm knows the dimensions of the example storage area 130 and can assume that luggage 132 takes up the entire volume from its two-dimensional boundary back to the back wall of the storage area 130, it is able to determine the used volume by simply determining the area of the front face of the luggage 132 and combining that with the known depth dimensions of the example storage area 130. Furthermore, in some embodiments, the computer vision algorithm can determine the free volume by subtracting the used volume described above from the overall or total volume of the example storage area 130 if it was empty.

One example way to determine the volume used by the luggage 132 is illustrated in FIG. 6. Once a luggage item 132 has been placed into the example storage area 130 and an image is captured and optimized the algorithm can analyze the pixel information of the optimized image data and determine the dimensions of the luggage item 132 by calculating how many pixels P of the image data include a part of the luggage item 132. Because the computer vision algorithm knows the dimensions of each pixel P, it will then be able to determine the dimensions of the luggage item 132, by adding up all the pixels P that include an indication that at least a part of the luggage item 132 is seen in the pixel P. In some embodiments, a simplistic computer algorithm with fewer pixels P will not have the resolution to obtain very precise dimensions. In such a case, the computer vision algorithm can determine that if a pixel P includes any part of the luggage item 132 it is included in the dimensions.

Those having ordinary skill in the art will appreciate that the computer vision algorithm can determine which pixels include parts of luggage and which pixels do not based on a reference pixel data point (i.e., compare a pixel of the image when baggage is not present to a pixel including a part of the baggage). Those having ordinary skill in the art will appreciate that the computer vision algorithm can distinguish between adjacent luggage items by identifying the edges of different pieces of luggage 132. Additionally, the computer vision algorithm is configured to detect and differentiate between different types of objects (i.e. carryon bags, jackets, sporting equipment, etc.) based on the identification of the edges of the objects. Once the edges are identified by the computer vision algorithm, it can better determine the occupied volume of the various luggage items or other goods stored in the storage area 130. More specifically, once the edges of each luggage item 132 are identified, the computer vision algorithm is configured to measure the distance of the edges via calculating the number of pixels covering the edges as described herein.

Finally, once the computer vision algorithm has determined the dimensions of the luggage item 132 by calculating the distance of the edges using the pixels identified as including the edge of the luggage 132, or some other method, the computer vision algorithm calculates the occupied volume and free volume of the storage area 130, based on the edge distance as described above.

Although the above description includes at least one method of calculating the occupied and free volume of the storage area 130, it should be noted that various other methods can be used to obtain more accurate and precise volume measurements. For example and without limitation, the cameras 106 can capture image data that includes more pixels P per unit length. As more pixels P are included, the dimension calculations can be more precise and the edges of the luggage 132 can be more accurate and precise as well. As described above with respect to FIG. 4E other devices, such as distance sensors and weight sensors can be included in the storage area to help get more accurate calculations of the used volume. For example and without limitation, instead of the computer vision algorithm assuming that the luggage item 132 takes up the entire volume of its two-dimensional boundary back to the back of the wall of the example storage area 130, one or more distance sensors can be used to determine the actual length of the luggage item 132 and how much depth the luggage item 132 has.

Various other methods of determining the occupied and free volume of the example storage area 130 are also envisioned and the subject matter herein should not be construed as to be limited to only the embodiments disclosed herein. For example and without limitation, in some embodiments, a three-dimensional (3D) measurement method can be used, wherein the 3D measurements are based on different viewing angles of multiple cameras directed at a sing storage area. In some other embodiments, the 3D measurements can be performed by using one or more 3D cameras.

Additionally, in some embodiments, the computer vision algorithm is configured to perform validity checks to ensure that images and/or videos that were take were valid (i.e. angle is proper, no obstructions, etc.). Moreover, in some embodiments, the computer vision algorithm is configured to anonymize passenger's features to assure passenger's privacy is protected.

Figure 7A:
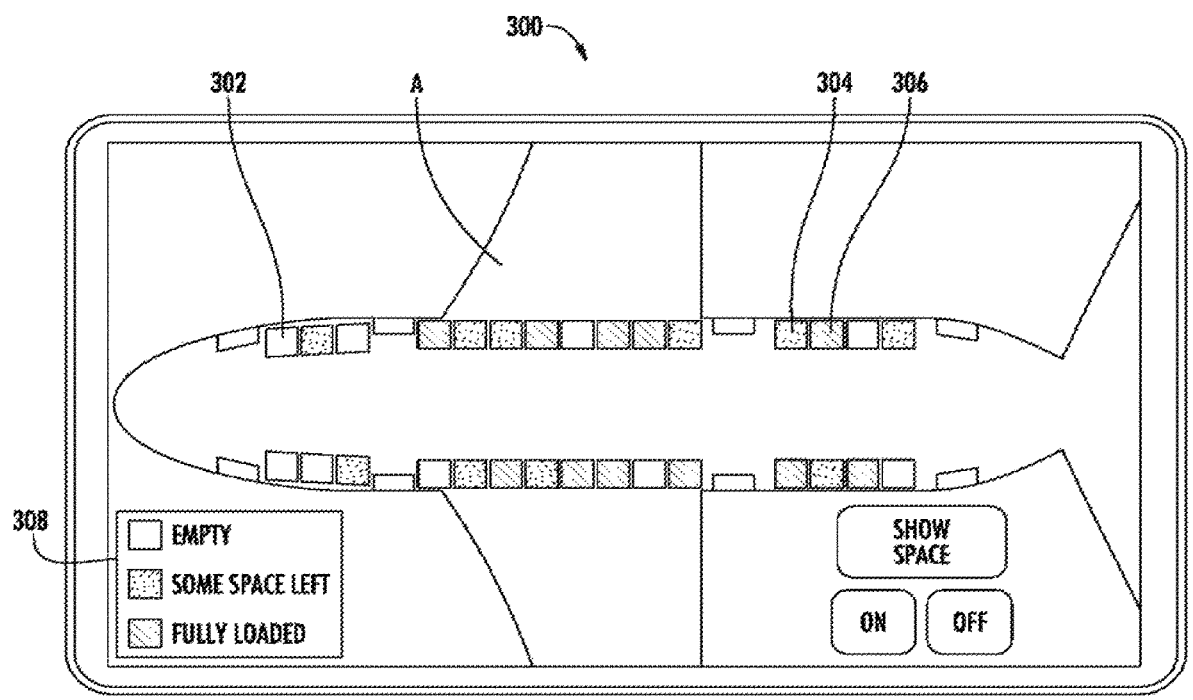
FIG. 7A and FIG. 7B illustrate example devices which can provide indications regarding which storage areas onboard the aircraft are full, partially full, or empty.

Once the occupied and/or free volume of each storage area is determined the results of the calculations can be utilized to inform or visualize for the flight attendants, passengers, or other users about the loading status (i.e., occupied and/or free volume) of each storage area. For example and without limitation, FIG. 7A illustrates a mobile device 300 such as a tablet, phone, or mobile PC, comprising a screen and running an application that is displaying a digital rendition or schematic of an aircraft A on the screen. The aircraft A can represent a physical aircraft the mobile device 300 is currently physically located on, or it can represent another aircraft (i.e., one nearby, for example if the mobile device was at the gate desk and airline staff could inform passengers of the current loading status as the passengers are scanning their boarding passes). On the screen, the digital representation of the aircraft A includes a plurality of storage areas such as OHSCs or other suitable storage areas. In some embodiments, on the display, each of the storage areas can be depicted with an indicia representing the current loading status of each respective storage area. As shown by the legend 308, each storage area can have some indicia on it indicating it is either "EMPTY," it has "SOME SPACE LEFT," or it is "FULLY LOADED." As illustrated by the figure there are a plurality of empty storage areas 302, semi-full storage areas 304, and full storage areas 306. More information can be included on the mobile device 300 display, such as, for example and without limitation, the seat number over which storage areas are located, approximately how much volume is unoccupied, or other information. In some embodiments, the mobile device 300 can be in communication with the central server 114 and/or processors 120 from FIG. 5B and FIG. 5C.

In some embodiments, the central processor 114 and/or processors 120 are configured to send and the mobile device 300 is configured to receive periodic (i.e. every few milliseconds, every second, every several seconds, every minute, etc.) updates regarding the loading status (i.e. occupied and/or free volume) of each of the storage areas. In some embodiments, the application running on the mobile device 300 is configured to update the indicia on the screen indicating the loading status of each of the storage areas either periodically or in real time as it receives updates from the central processor 114 and/or processors 120. The application running on the mobile device 300 is configured such that based on the aircraft A selected by the user or based on the aircraft A the mobile device is currently located on, the number, location, and type of storage areas displayed on the aircraft A is an accurate depiction and illustration of the physical storage areas on the physical aircraft. This concept is equally relevant to other vehicles, warehouses, and other buildings the storage area loading status measuring system 100 of the present disclosure is being used for. For example, in some embodiments, when the storage area loading status measuring system 100 is being used for a commercial warehouse, the mobile device 300 can be configured to display a schematic of the physical warehouse and its respective storage areas.

Figure 7B:
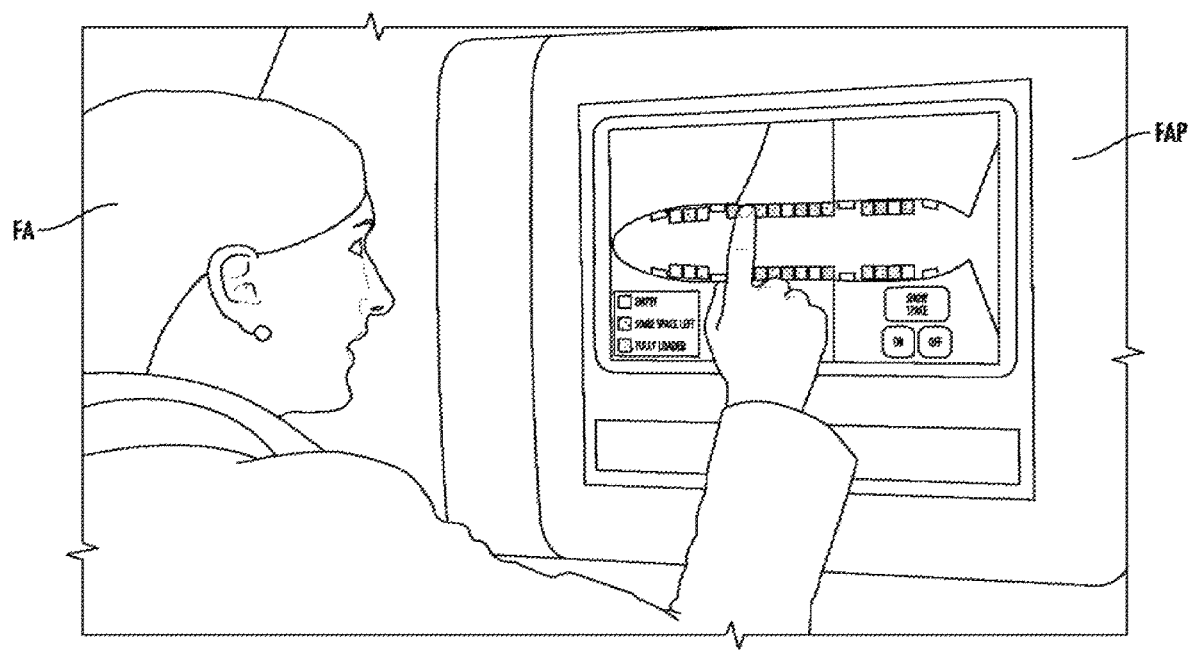

In addition to mobile devices 300, the application can be operated on a flight attendant panel FAP and operated by a flight attendant FA as shown in FIG. 7B. The operational description of the flight attendant panel FAP is the same as the mobile device 300 as described above. Additionally, in some embodiments, the application can be operated on any computer or processor and displayed on a display at the loading gate, or other suitable location, to let passengers who have not yet entered the aircraft know the loading status of the storage areas on the aircraft they are boarding.

In either scenario, the computer vision algorithm running on the central processor 114 and/or processors 120 can be configured to provide an optimized storage arrangement and transmit it to either the mobile device 300, flight attendant panel FAP, or various other possible devices for display. In other words, the computer vision algorithm can be configured to determine other locations or a combination of locations where luggage can be stored in order to optimize storage space and loading statuses of different storage locations. In order to do that, the computer vision algorithm can receive inputs from the flight attendant, a user, passenger, or other relevant party that details a current piece of luggage that needs to be stored in the storage area. Thus, the computer vision algorithm can refer the passenger to a storage location where they can store their luggage based on an input of the dimensions of their luggage. Additionally, the computer algorithm can refer a flight attendant or other user to one or more storage areas that currently stored luggage can be rearranged to or moved to such that the storage of the luggage is optimized.

Figure 8A:
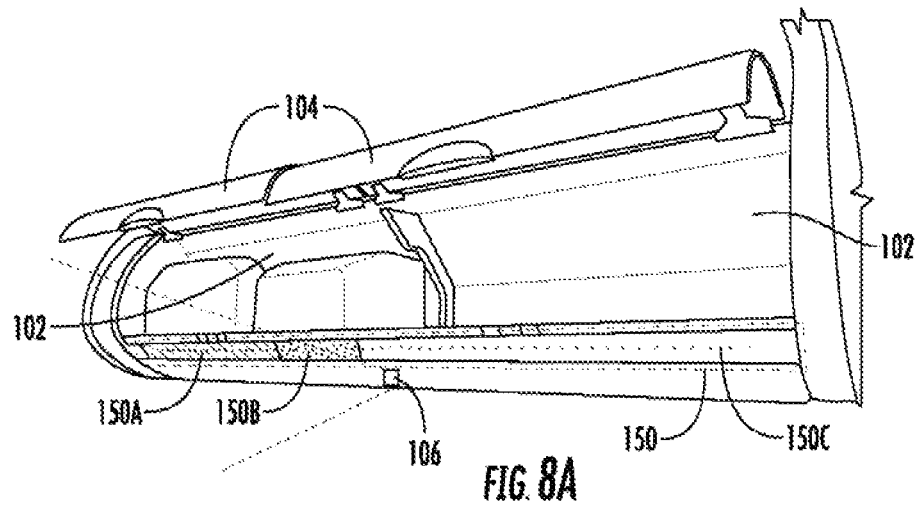
FIG. 8A and FIG. 8B illustrate an outside view of an example storage area of an aircraft with visual indicators at the bottom indicating which portions of the storage area are full or empty and also illustrates various positions of cameras used by the system of the present disclosure.

FIG. 8A illustrates a physical storage area, OHSC 102 that includes two doors 104 that are opened. The loading status of each of the OHSCs 102 can be physically displayed or indicated to the passengers and flight attendants as well. For example, FIG. 8A also illustrates an array of LEDs 150 at the bottom of the OHSC 102, just above the camera 106. Portions of the LEDs 150 can be lit certain colors to indicate to passengers and flight attendants which portions of the OHSC 102 are loaded or not. For example, all of the LEDs in first LED section 150A can give off the same light color (hatched for illustrative purposes only) to indicate that the section of the OHSC 102 that is lined up with the first LED section 150A is completely full of baggage. This corresponds with the fact that physical luggage is shown on the far left side in the OHSC 102 above the first LED section 150A. All of the LEDs in the second LED section 1506, are lit up a different color from the first LED section 150A indicating that this section of the OHSC 102 above the second LED section 1506 is only partially occupied. And finally, all of the LEDs in the third LED section 150C are lit the same color, indicating that the OHSC 102 section is empty (far right).

In some embodiments, the LED array 150 can be split up into any number of sections to help more precisely indicate what sections of the OHSC 102 are occupied or free. For example, the LED array 150 can be split up into 1 to 10 sections (or more) corresponding to 1 to 10 (or more) different sections of the OHSC 102.

Figure 8B:
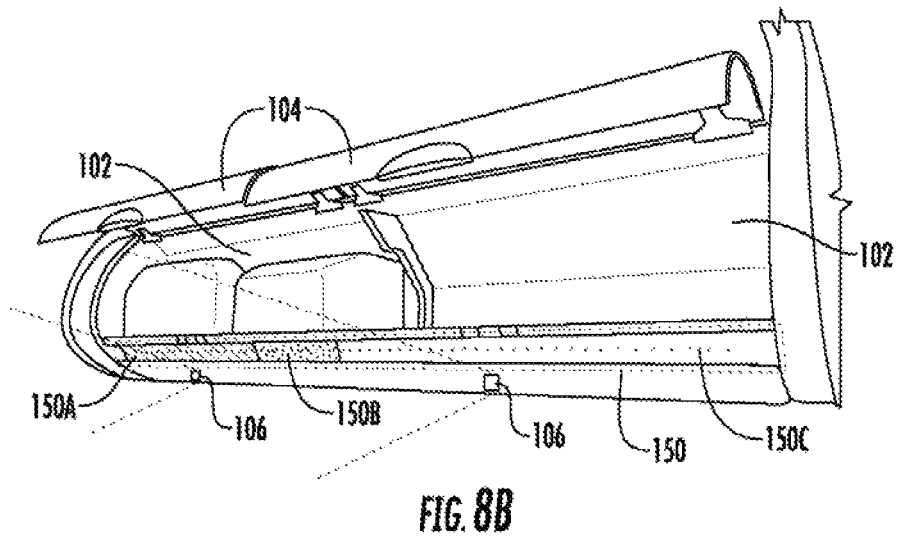

In some embodiments, the storage area loading status measuring system 100 of the present disclosure can comprise a single camera 106 per OHSC 102 with two doors 104, the camera 106 being positioned in the middle of the OHSC 102 where the two doors 104 meet. FIG. 8B illustrates an alternative layout wherein one camera 106 is located in the middle of each section of the OHSC 102 below and at the middle of each door 104. The number of cameras 106 can also be greater than two, however, the more cameras 106, the more complex the algorithms and installations need to be in order to splice the images together.

Figure 9:
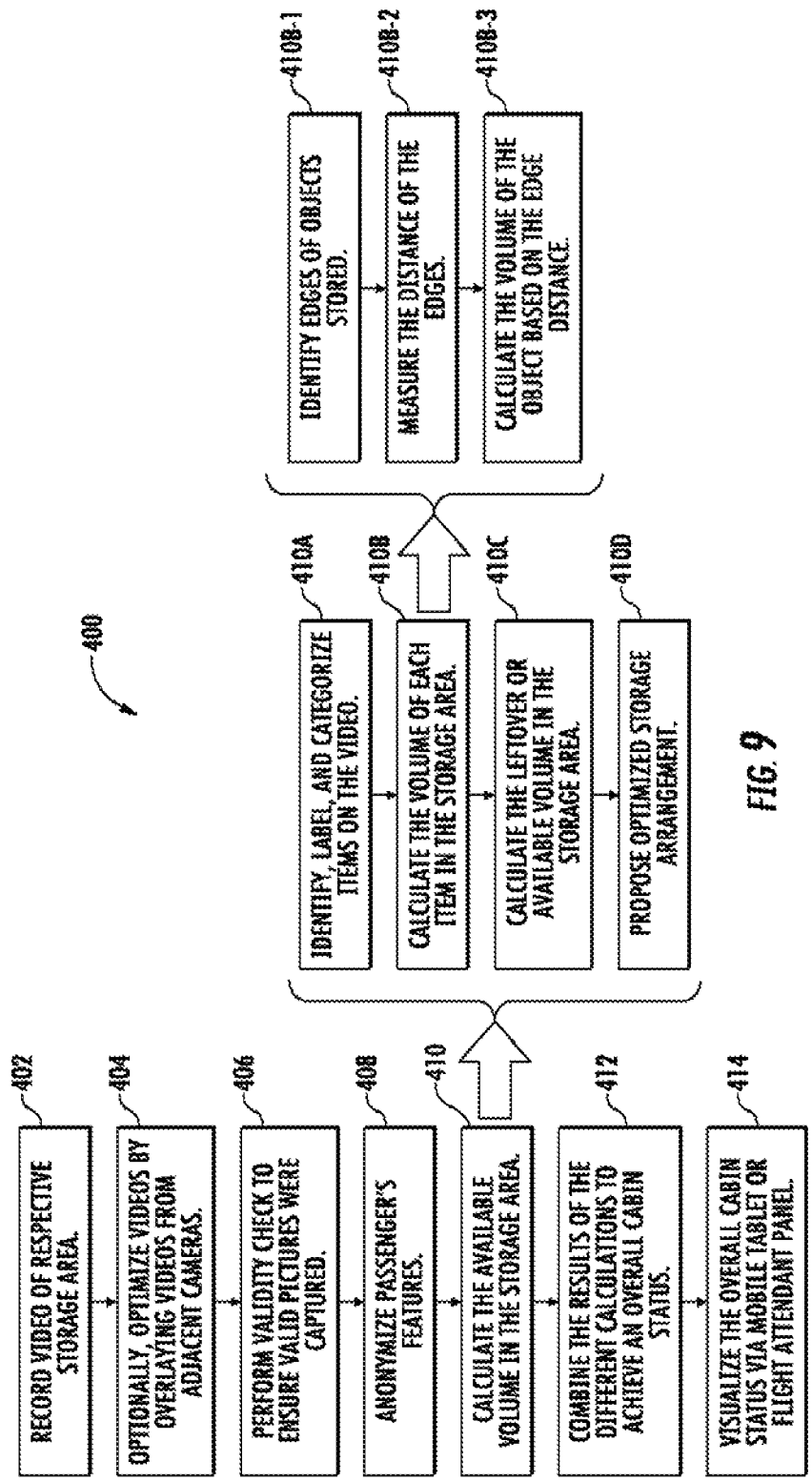
FIG. 9 illustrates a flow chart describing an example method and volume measuring algorithm according to the present disclosure.

FIG. 9 illustrates a flow chart 400 of an example computer-implemented method for monitoring the loading status of baggage (i.e., luggage, person effects, parcels, etc.) in storage areas. The first step 402 of the example method comprises recording images and/or video of a respective storage area. The second step 404 of the example comprises optionally, optimizing the images and/or videos by overlaying images and/or videos from adjacent cameras. In some embodiments, the third step 406 of the example comprises performing validity checks to ensure valid pictures were captured. In some embodiments, when an invalid picture or image exists (i.e. the OHSC is closed) the latest available picture or image can be used to determine the current loading status. The fourth step 408 of the example method comprises anonymizing passenger's features so as to protect the privacy of the passengers.

The fifth step 410 of the example method comprises calculating the available volume in the respective storage area. In some embodiments, calculating the available volume in the respective storage area comprises several sub-steps. A first sub-step 410A of the method comprises identifying, labeling, and categorizing items in the video. Next, in a second sub-step 410B, the example method comprises calculating the volume of each item in the storage area. In some embodiments, the second sub-step 410B comprises several sub-parts. The first sub-part 410B-1 of the example method can comprise identifying the edges of the objects stored in the storage area. The second sub-part 410B-2 of the example method can comprise measuring the distance of the edges as described hereinabove. The third sub-part 410B-3 of the example method can comprise calculating the volume of the object based on the edge distance.

In some embodiments, the third sub-step 410C of the example method comprises calculating the leftover or available volume in the storage area. The fourth sub-step 410D of the example method can comprise proposing optimized storage arrangements or locations where particular objects can be stored. After the several sub-steps and sub-parts of the fifth step 410 of the example method have been completed, in some embodiments, the sixth step of the example method comprises combining the results of the different calculations to achieve an overall cabin status. Once this overall cabin status has been obtained, a seventh step 414 of the example method comprises visualizing the overall cabin status via a mobile table or flight attendant panel or other suitable device.

Although the above method is described in a particular order, those having ordinary skill in the art will appreciate that any of the steps can be performed in any suitable order.

Figure 10A:
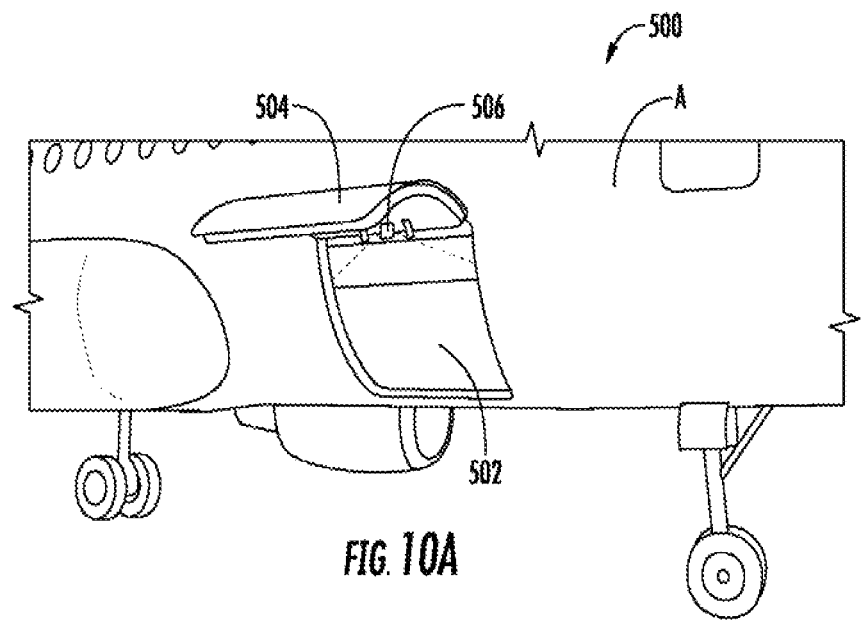
FIG. 10A and FIG. 10B illustrate an outer cargo storage area of an aircraft comprising an example system according to some embodiments of the present disclosure.
Figure 10B:
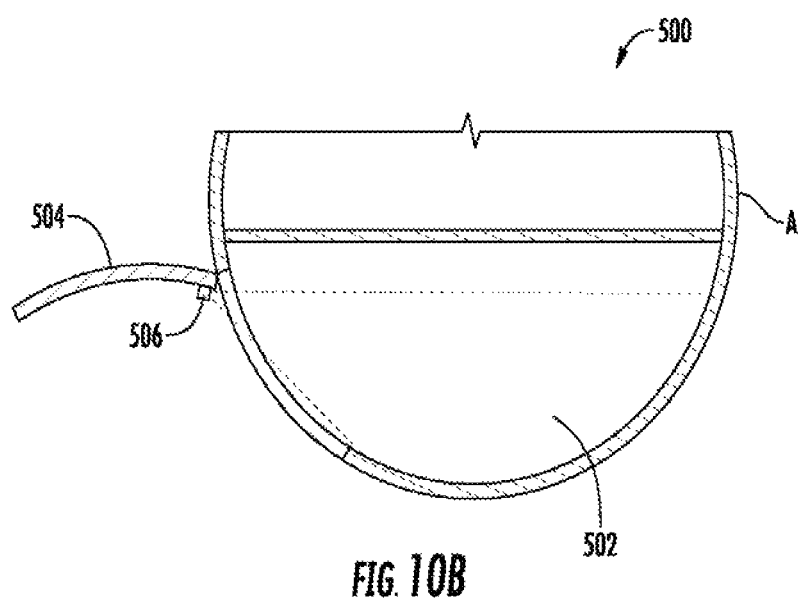

FIG. 10A, illustrates the outside 500 of an aircraft A. More specifically on the side of the aircraft A where cargo is stored. This illustration highlights some of the other uses of the storage area loading status measuring system of the present disclosure and how it can be used in other places beyond in the aisle of the aircraft. The cargo storage area 502 can include a door 504 and a camera 506 attached to the top of the door 504. Just as described above, the camera 506 can be configured to take pictures of the inside of the cargo storage area 502, just as the cameras above were used to capture images and/or video of the overhead storage compartments (OHSCs). FIG. 10B depicts a side cross-sectional view of the aircraft A and shows how the camera 506, attached to the top of the door 504 can be used like the cameras above, except in this case, instead of viewing the OHSCs on opposite sides of the aisle, this camera 506 is positioned such that it captures the cargo storage area 502. In some embodiments, the storage area loading status measuring system can operate the same as described above except the image and video data will come from the cargo storage area 502 and be sent to the central processor or some other processor running the computer vision algorithm for processing as described hereinabove. Those having ordinary skill in the art will appreciate that the computer vision algorithm will need to be updated and adapted to recognize and know the dimensions of the cargo storage area 502. Otherwise, the procedures described hereinabove can be used in this scenario as well.

These drawings and description above with respect to FIG. 10A and FIG. 10B help to highlight the fact that the storage area loading status measuring system of the present disclosure can be updated and adapted to work in any commercial building or transport vehicle or warehouse comprising storage areas.

By using some of the methods and systems described hereinabove, the turn-around time for the airline, commercial enterprise, or other transportation company can be minimized. This can, for example, mean that airline and other transportation vehicle passengers get onboard and seated faster and flights, trains, and buses can take off again faster than before. Minimizing the turn-around time also can mean that commercial warehouses are restocked faster or that goods are shipped faster.

In some embodiments, the processing module or processors, or memories associated with them, can store data associated with passenger luggage or other objects stored in the storage areas in a database. The stored data can be used to predict optimum usage of the storage areas, for example, according to passenger loading, flight route, and/or other purposes. This can be done by including in the system of the present disclosure one or more algorithm comprising a machine learning component. The machine learning component can be used to help "train" the computer vision algorithm to determine optimized storage arrangements as discussed herein.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

The invention claimed is:

1. A computer-implemented system for monitoring loading status of a physical storage area, comprising:
   a camera system comprising one or more camera wherein each camera is configured to capture video or images, or both video and images, of the storage area; and,
   one or more processing module in communication with the camera system, the one or more processing module comprising one or more processor and the processing module configured to:
      receive image or video data from the one or more camera of the camera system;
      determine unoccupied volume of the storage area based on the received image or video data; and,
      use the determined unoccupied volume of the storage area to provide output data that can be displayed to indicate loading status of the storage area,
   wherein the processing module operates in real time to provide continuous loading status updates of the physical storage area, and
   wherein determining the unoccupied volume comprises
      identifying object boundaries within the captured image data using edge detection,
      calculating object volume based on dimensions, and
      subtracting a sum of stored object volumes from a total storage volume.

2. The computer-implemented system of claim 1, wherein the one or more camera is mounted outside of the storage area.

3. The computer-implemented system of claim 2, wherein the one or more camera is mounted at a camera location spaced apart a distance from the storage area.

4. The computer-implemented system of claim 3, wherein the camera location is within a passenger cabin of an aircraft, and wherein the camera location is proximate to or on another, spaced apart physical storage area.

5. The computer-implemented system of claim 3, wherein the camera location is within a passenger cabin of an aircraft, and wherein the camera location is on a ceiling of the passenger cabin.

6. The computer-implemented system of claim 1, wherein the camera location is within a storage area of a transport vehicle.

7. The computer-implemented system of claim 1, wherein the one or more camera is mounted inside the storage area.

8. The computer-implemented system of claim 1, wherein the storage area comprises a plurality of separate storage areas, and wherein the camera system comprises a plurality of cameras, each camera positioned and configured to capture video or images, or both video and images, of one or more of the separate storage areas.

9. The computer-implemented system of claim 8, wherein each camera is configured to capture video or images, or both video and images, of at least one or more storage area that another of the cameras is positioned and configured to capture video or images, or both video and images, of such that the cameras have overlapping fields of view.

10. The computer-implemented system of claim 1, comprising a display configured to display indicia representative of the loading status of the storage area.

11. The computer-implemented system of claim 10, wherein the display further comprises one or a combination of:
   a mobile device in communication with the processing module;
   a terminal in communication with the processing module;
   an array of LEDs in communication with the processing module.

12. The computer-implemented system of claim 1, further comprising one or more sensors, wherein the processing module is further configured to use data from the one or more sensors to more accurately determine the unoccupied volume of the storage area.

13. The computer-implemented system of claim 12, wherein the one or more sensors are configured to measure distance or weight or both distance and weight.

14. A computer-implemented system for a passenger transport vehicle for monitoring storage of baggage in storage areas, comprising:
   a plurality of physical storage areas in a passenger cabin of the transport vehicle, wherein the storage areas comprise and define separate storage spaces;
   a camera system comprising a plurality of cameras positioned in the passenger cabin and configured to capture video or images, or both video and images, of the storage spaces;
   each of the plurality of cameras being positioned and configured to capture video or images, or both video and images, of a storage space and at least a portion of an adjacent storage area such that at least some of the cameras have overlapping fields of view; and a processing module in communication with the camera system, the processing module comprising a processor and configured to:
    receive image or video data from the one or more camera of the camera system;
    determine unoccupied volume of the storage area based on the received image or video data;
    use the determined unoccupied volume of the storage area to provide output data; and,
wherein the processing module operates in real time to provide continuous loading status updates of the physical storage area, and
wherein determining the unoccupied volume comprises
    identifying object boundaries within the captured image data using edge detection,
    calculating object volume based on dimensions, and
    subtracting a sum of stored object volumes from a total storage volume,
    use the output data to provide an optimized storage arrangement for objects,
    wherein the optimized storage arrangement can be displayed.

15. A computer-implemented method for monitoring loading status of objects in storage areas, comprising:
    using a camera system comprising one or more camera wherein each camera is configured to capture video or images, or both video and images, of at least one or more physical storage area for storing objects;
    using a processing module that comprises a processor and that is in communication with the camera system to:
        receive image or video data from the one or more camera of the camera system;
        determine unoccupied volume of the storage area based on the received image or video data; and
        use the determined unoccupied volume of the storage area to provide output data that can be displayed to indicate loading status of the storage area,
    wherein the processing module operates in real time to provide continuous loading status updates of the physical storage area, and
    wherein determining the unoccupied volume comprises
        identifying object boundaries within the captured image data using edge detection,
        calculating object volume based on dimensions, and
        subtracting a sum of stored object volumes from a total storage volume.

16. The method of claim 15, further comprising using the output data to provide an optimized storage arrangement for objects, wherein the optimized storage arrangement can be displayed.

\* \* \* \* \*